United States Patent [19]

Barke

[11] Patent Number: 5,025,245

[45] Date of Patent: Jun. 18, 1991

[54] PEDESTRIAN SIGNAL SYSTEM FOR AUTOMOBILES

[76] Inventor: Otto Barke, 6423 - 14 Avenue, Edmonton, Alberta, Canada, T6L 1Y1

[21] Appl. No.: 371,005

[22] Filed: Jun. 26, 1989

[30] Foreign Application Priority Data

Nov. 24, 1988 [CA] Canada .................................. 584368

[51] Int. Cl.$^5$ .............................................. B60Q 1/26
[52] U.S. Cl. .................................... 340/471; 340/479
[58] Field of Search ............... 340/471, 472, 475, 479, 340/468; 307/10.8; 315/83

[56] References Cited

U.S. PATENT DOCUMENTS

| | | | |
|---|---|---|---|
| 3,492,639 | 1/1970 | Bevacqua | 340/471 |
| 3,492,640 | 1/1970 | White | 340/471 |
| 3,493,927 | 2/1970 | Effenberger | 340/471 |
| 3,629,821 | 12/1971 | Dobbins | 340/471 |
| 3,925,759 | 12/1975 | Lucas | 340/471 |
| 4,155,069 | 5/1979 | Mason | 340/471 |
| 4,587,512 | 5/1986 | Casey | 340/471 X |

Primary Examiner—Joseph A. Orsino
Assistant Examiner—Brian R. Tumm
Attorney, Agent, or Firm—George Haining Dunsmuir

[57] ABSTRACT

An auxiliary pedestrian crossing warning signal system for use in automobiles equipped with a main signal system including front and rear, left and right amber turn indicator lamps incorporates an alternating flasher into the main signal system via a relay to provide communication between a driver and a pedestrian in order to reduce vehicle-pedestrian collisions. An automatic shut-off timer is connected to the relay circuit for controlling the duration of the auxiliary system operation after the brake pedal is released. The auxiliary system is operated by a momentary pressure on a pushbutton switch mounted in the dashboard and by the application of pressure to the vehicle brake pedal, so that the auxiliary system operates only when the pushbutton is energized and the vehicle is stopped. In addition to the in-dash indicator lights, a pair of indicator lights can be mounted beside the pushbutton switch as an additional indication that the auxiliary system is in operation.

3 Claims, 2 Drawing Sheets

PEDESTRIAN SIGNAL SYSTEM FOR AUTOMOBILES

BACKGROUND OF THE INVENTION

The present invention relates to a signalling system for use in automobiles, and is specifically directed to an auxiliary pedestrian crossing warning light system.

The speed of automobiles and the volume of traffic on streets and highways today are such that the safety of pedestrians is a cause for great concern. In Canada alone, due at least in part to the lack of approved communication between driver and pedestrian, there were 688 pedestrian fatalities and more than 17,000 pedestrian injuries per year during the period 1979–1986.

Modern automotive vehicles are equipped with headlamps, parking lights, tail lamps, stop lights, turn indicator lamps, seatbelts in front and rear seats and many other features for the safety and convenience of those who use the vehicles. However, there are currently no vehicles equipped with any type or feature directed to pedestrian safety.

Examples of auxiliary indicator or signal systems for vehicles are found in Canadian Patents Nos. 756,254, which issued to H. Epstein on Apr. 4, 1967; 840,605, which issued to Gaetan de Coye de Castelet on Apr. 28, 1970; 900,005, which issued to R.P. Ballou, Howell on May 9, 1972; 923,208, which issued to D.G. Williams et al on Mar. 20, 1973 and U.S. Pat. Nos. 2,724,102, which issued to J.R. Hollins on Nov. 15, 1955; 2,825,045, which issued to J.R. Hollins on Feb. 25, 1958; 2,835,880, which issued to C.R. Daws on May 20. 1958; 2,851,673, which issued to J.R. Hollins on Sept. 9, 1958; 3,185,961, which issued to G.A. Du Rocher on May 25, 1965; 3,273,117, which issued to S. Martauz on Sept. 13, 1966 and 3,925,759, which issued to D.F. Lucas on Dec. 9, 1975.

The object of the present invention is to provide an auxiliary system which can be used in conjunction with an existing automotive signalling system to give greater protection to pedestrians.

BRIEF SUMMARY OF THE INVENTION

Accordingly, the present invention relates to an auxiliary signal system for automobiles of the type including a main signal system defined by front and rear, right and left stop and amber turn indicators, and a flasher for indicating an emergency, said system comprising relay means for connection to the main signal system to supply power to the auxiliary system and to render the main signal inoperative when the auxiliary system is operating, auxiliary flasher means for supplying power alternately to the left and right vehicle turn indicators when the relay means is activated; timer means connected to said relay for controlling the duration of operation and automatic shut-off of the auxiliary system; control circuit means converted to and receiving power from said main signal system and from the vehicle brake system, said control circuit means incorporating said relay means and said timer for controlling operation of said flasher means, whereby actuation of the vehicle brakes and of the control circuit means by a driver causes alternating flashing of the vehicle front and rear turn indicator lights for a predetermined period of time after the brake pedal is released.

Thus, the present invention ensures that the left and right, front and rear amber turn indicator lamps are flashed in an alternating manner as an exclusive signal indicating the presence of pedestrians. When in operation, the rear alternating signal is an advance warning to the operator of another vehicle behind the vehicle with the system operating that the car in front is stopping or has stopped for the purpose of pedestrian crossing. The front alternating signal is a warning to the on-coming traffic that the vehicle is stopping or has stopped to allow pedestrians to cross the road. Obviously, it is desirable for a pedestrian waiting at an intersection for the opportune moment to cross to know whether a driver is aware of his or her intention to cross the roadway. Therefore, the front alternating signal is also an acknowledgement from the driver to the pedestrian that his/her intention to cross the road has been recognized and that the driver is preparing to stop which permits the pedestrian to cross the road in safety.

Through this simple exchange of information, needless collisions can and will be avoided. A reduction in the number of collisions will directly result in the reduction of insurance claims and hospital bills. Of course, the monetary loss is relatively unimportant in comparison to the many years of needless human suffering which will be eliminated.

DESCRIPTION OF THE DRAWINGS

The invention will be described in greater detail with reference to the accompanying drawings, which illustrate a preferred embodiment of the invention, and wherein.

DESCRIPTION OF THE PREFERRED EMBODIMENT(S)

Figure 1:
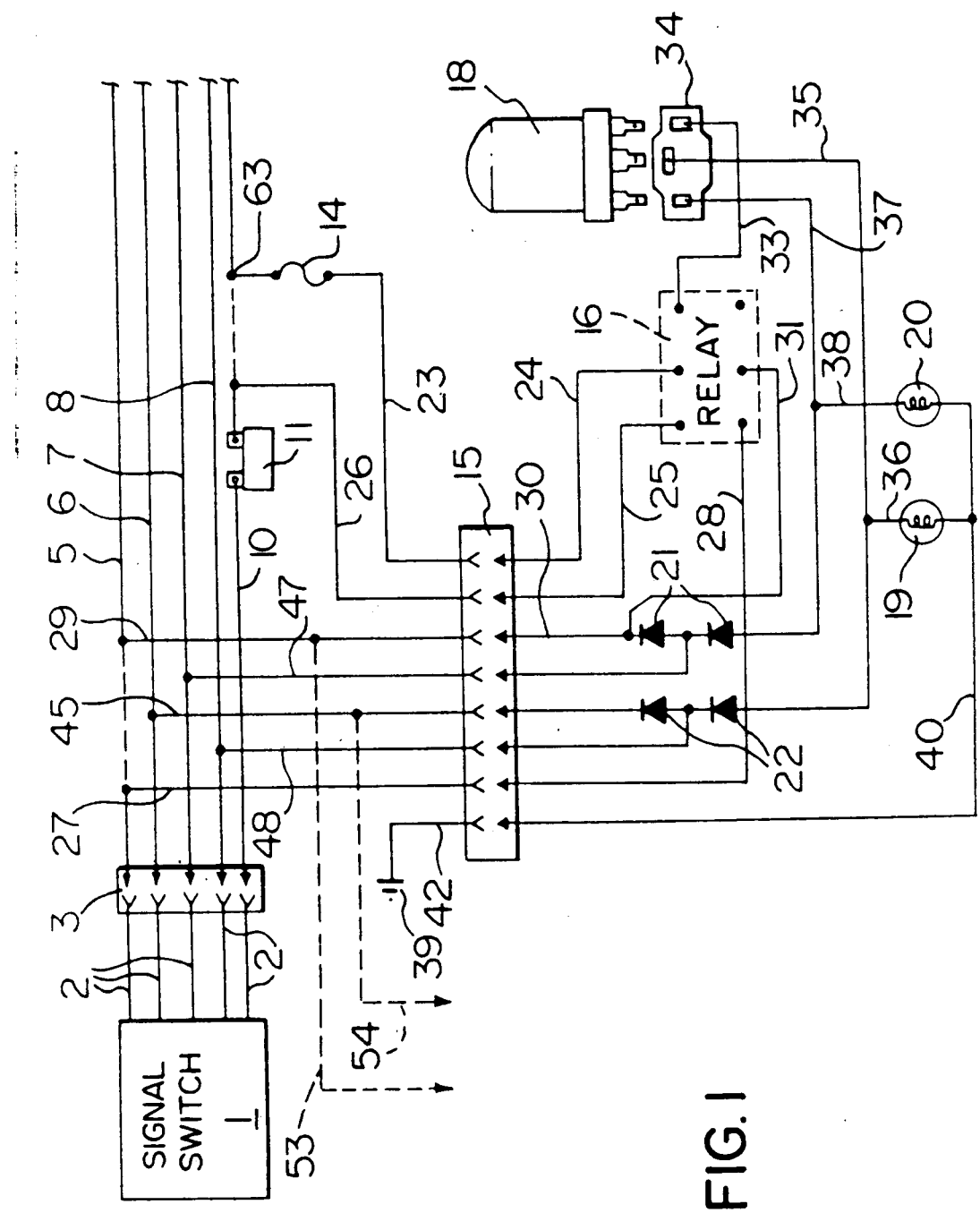
FIG. 1 is a schematic block circuit diagram of a conventional turn signal system incorporating the device of the present invention.

With reference to FIG. 1 of the drawings, the signal device of the present invention is intended for use in a conventional vehicle signalling circuit of the type including a turn signal activating switch 1 mounted on the steering column beneath the vehicle steering wheel (not shown) and connected through leads 2 and a connector strip 3 mounted on the steering column (not shown) to a right rear signal light wire 5, a left rear signal light wire 6, a right front signal light wire 7, a left front signal light wire 8 and to a battery wire 10 which is connected to the positive pole of the vehicle battery (not shown). A flasher 11 of the type designed to cause intermittent operation of the front and rear signal lights is mounted in the wire 10 between the battery and the switch 1.

Figure 2:
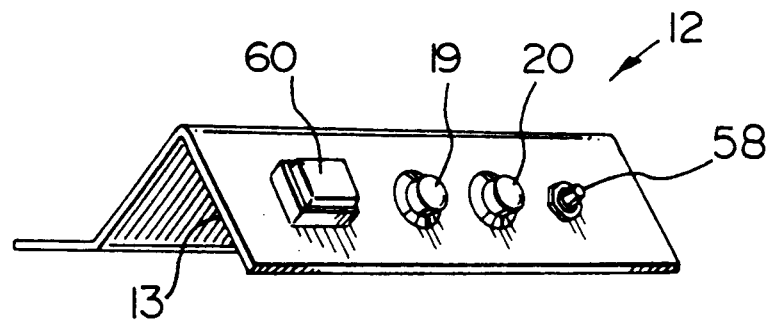
FIG. 2 is a perspective view from one end of a control panel used in the device of the present invention.
Figure 3:
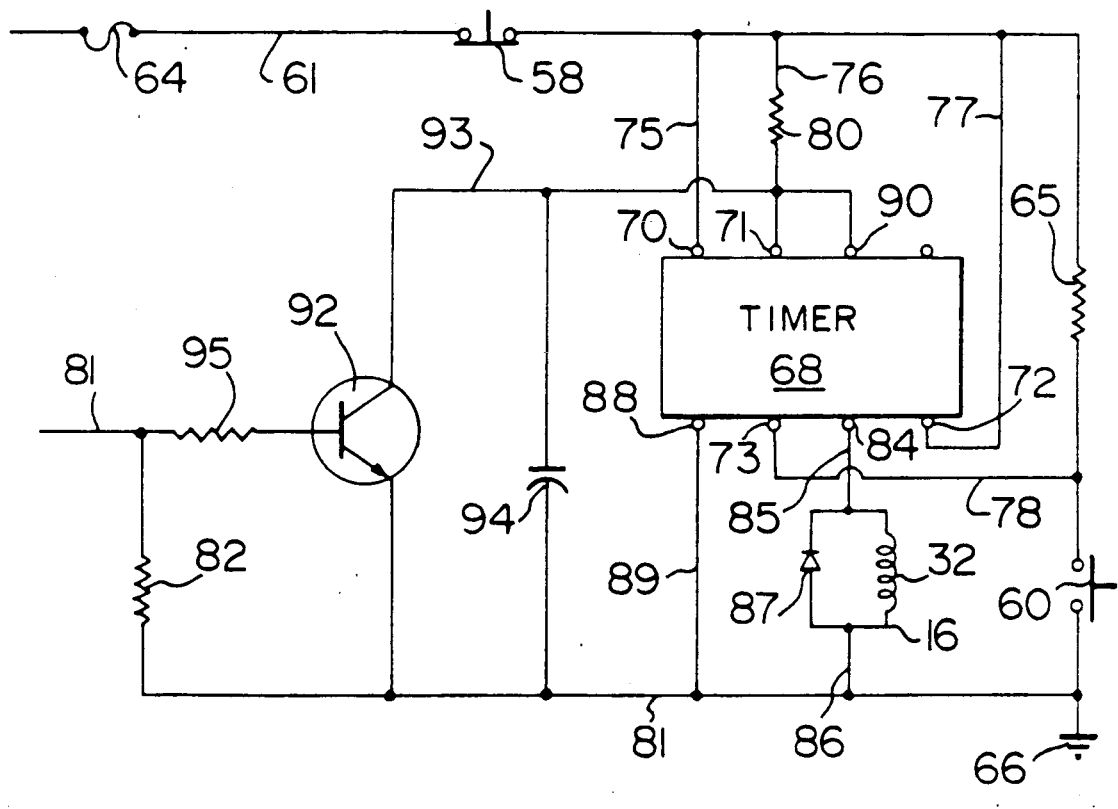
FIG. 3 is a schematic circuit drawing of a control module used in the device of the present invention.

The device of the present invention includes a control panel generally indicated at 12 (FIG. 2) defined by a bent metal plate 13 for mounting on a vehicle dashboard, a control module, the circuit of which is shown in FIG. 3 and the additional elements shown in FIG. 1. Such additional elements include a fuse 14, a multiple connector strip 15, a relay 16, an alternating flasher 18, left and right indicator lights 19 and 20, which are mounted on the control panel 12, and diodes 21 and 22. The diodes 21 and 22 prevent damage to the relay 16 by back EMF during normal operation of the vehicle signal lights. The battery wire 10 is cut to provide a power source for the auxiliary device and to render the main signal system inoperative during the auxiliary system operation. The wire is connected by lead 23, the fuse 14, the strip 15, and lead 24 to the relay 16. Power normally passes through the relay 16, a line 25, the strip 15 and a line 26 to the signal switch end of the wire 10k i.e. the existing automobile signals operate in the conventional manner. The right rear signal wire 5 is also cut, and the ends connected to the relay 16 by leads 27 and 28 and connector strip 15, and by leads 29, 30 and 31 and the connector strip 15, respectively. Thus, the relay 16 completes a circuit with the existing signalling system of the vehicle.

When the coil 32 of the relay 16 is energized, power passes through line 33 to the base 34 of the alternating flasher 18, and from the flasher through lines 35, 36, 37 and 38 to left and right indicator lights 19 and 20. The lights 19 and 20 are connected to ground at 39 by lines 40 and 42 and the connector strip 15. The lines 35 and 37 also connect the flasher 18 to diodes 21 and 22, which are connected by leads 29 and 45, and the connector strip 15 to the right and left rear signal wires 5 and 6, respectively. Additional leads 47 and 48 connect the diodes 21 and 22 to the right and left front signal wires 7 and 8, respectively. If two additional rear light signals (not shown) are installed in the vehicle, such signals are connected to the leads 29 and 45 by lines 53 and 54, respectively. The portion of the right rear signal wire 5 between the leads 27 and 29 is removed. During normal operation of the vehicle signal system, leads 29, 30 and 31, the relay 16, and leads 27 and 28 complete a circuit between the switch 1 and the right rear signal.

With reference to FIG. 2, the control panel 12 is defined by a metal bracket 13 which is mounted on a vehicle dashboard (not shown) and connected to the control module (FIG. 3). The signal lights 19 and 20 (optional) are mounted on the bracket 13 between pushbuttons 58 and 60. Pushbutton 58 is merely an override switch for manually deactivating the signals, in case of automatic shut-off failure.

The pushbuttons 58 and 60 are in a line 61 connected to the battery wire 10 at point 63 (FIG. 1). A fuse 64 and a pull-up 1k ohm resistor 65 are provided in the line 61, which is also connected to ground at 66. The main element of the control circuit is an integrated circuit timer 68 (LM555 or equivalent), contacts 70, 71, 72 and 73 of which are connected to the line 61 by leads 75, 76, 77 and 78, respectively. The resistor 65 ensures that the trigger input of the timer 68 is held high whenever the button 60 is not energized. A 110k ohm timing resistor 80 is provided in the line 76.

The ground end of the line 81 is connected to the negative terminal of the brake switch (not shown), i.e. the rear brake stop light switch by a lead containing a 1k ohm resistor 82. The relay 16 is connected to contact 84 of the timer 68 by lead 85, and to the lead 81 by wire 86. A diode 87 is provided in the relay 16 to prevent damage to the timer 68 because of back EMF. The lead 81 is also connected to contact 88 of the timer 68 by a wire 89. Finally contact 90 of the timer 68 is connected to a transistor 92 by a lead 93. A 22 µf capacitor 94 is provided between the leads 81 and 93. The base of the transistor 92 is connected to the line 81 and the brake switch by an 8200 ohm resistor 95, which limits the base current into the transistor 92.

In operation, when the automobile is stopping or has stopped to allow pedestrians to cross the road, the driver momentarily pushes the button 60 on the control panel 12. At the same time, a signal from the energized brake switch is applied to the control circuit (FIG. 3). This mixture of signals will ground the trigger input defined by contact 73 of the timer 68, causing the timer output contact 84 to switch immediately from a low or zero volt output to a high or 12 volt output. Current flows from the contact 84 through the relay coil 32 to ground at 66, thereby energizing the relay 16. The relay 16 then supplies current to the alternating flasher 18. The flasher 18 supplies current alternately to the left and right dashboard indicator lights 19 and 20 on the control panel 12, and to the left and right, front and rear automobile signal lights including to the in-dash indicator lights (not shown).

Because the brake pedal is being pressed, 12 volts from the brake switch causes the transistor 92 to be biased to the "on" condition. Thus, a direct short circuit is applied across the timing capacitor 94 to prevent charging of the latter, whereby the output from the timer 68 remains in the high condition, allowing the alternating flasher 18 to operate.

When the brake pedal is released, the capacitor 94 begins to charge through the timing resistor 80 because the transistor 92 is turned off and ceases to short out the capacitor. The charge time is determined by the formula:

$$t = 1.1 RC$$

Where t is the time in seconds, R is the resistance in ohms and C is the capacitance in farads. For the values given above, the charge time is 2.2 seconds. After the 2.2 seconds, the output of the timer 68 to the relay 16 goes low, whereby no current flows through the coil 32 to the flasher 18. The relay coil 32 thus de-energized causes the contacts shown in FIG. 1 to switch from supplying power to the flasher 18 to the normal signal light operating position.

What I claim is:

1. An auxiliary signal system for automobiles of the type including a main signal system defined by front and rear, right and left stop and amber turn indicators, and a flasher for indicating an emergency, said auxiliary signal system comprising relay means for connection to the main signal system to supply power to the auxiliary system and to render the main signal system inoperative when the auxiliary system is operating, auxiliary flasher means for supplying power alternately to the left and right vehicle turn indicators when the relay means is activated; timer means connected to said relay means for controlling the duration of operation and automatic shut-off of the auxiliary system; control circuit means connected to and receiving power from said main signal system and from the vehicle brake system, said control circuit means incorporating said relay means and said timer means for controlling operation of said flasher means, whereby actuation of the vehicle brakes and of the control circuit means by a driver causes alternating flashing of the vehicle front and rear turn indicator lights which continues for a predetermined period of time after the brake pedal is released.

2. A signal system according to claim 1, wherein said control circuit means includes first switch means for mounting on a vehicle dashboard for closing by the driver to initiate operation of the system when the vehicle brakes are actuated.

3. A signal system according to claim 2, wherein said control circuit means includes second switch means for mounting on the vehicle dashboard for opening by the driver to de-activate the signal system in case of automatic shutoff failure.

* * * * *